United States Patent
Yan et al.

(10) Patent No.: US 11,062,089 B2
(45) Date of Patent: Jul. 13, 2021

(54) METHOD AND APPARATUS FOR GENERATING INFORMATION

(71) Applicant: Baidu Online Network Technology (Beijing) Co., Ltd., Beijing (CN)

(72) Inventors: Shengli Yan, Beijing (CN); Cunxiang Yin, Beijing (CN); Qian Yong, Beijing (CN); Ting Wei, Beijing (CN); Aikun Li, Beijing (CN); Lu Wang, Beijing (CN); Licen Liu, Beijing (CN); Weijia Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 271 days.

(21) Appl. No.: 16/133,288

(22) Filed: Sep. 17, 2018

(65) Prior Publication Data

US 2019/0163742 A1 May 30, 2019

(30) Foreign Application Priority Data

Nov. 28, 2017 (CN) .......................... 201711214477.X

(51) Int. Cl.
*G06F 40/20* (2020.01)
*G06F 40/30* (2020.01)
(Continued)

(52) U.S. Cl.
CPC ............ *G06F 40/30* (2020.01); *G06F 16/355* (2019.01); *G06F 40/279* (2020.01);
(Continued)

(58) Field of Classification Search
None
See application file for complete search history.

(56) References Cited

U.S. PATENT DOCUMENTS 8,892,488 B2 * 11/2014 Qi .......................... G06F 40/30
706/45
9,015,035 B2 * 4/2015 Djordjevic ............ G06F 40/279
704/9
(Continued)

FOREIGN PATENT DOCUMENTS

| CN | 106296653 | 1/2017 |
| CN | 106776581 | 5/2017 |

(Continued)

*Primary Examiner* — Richard Z Zhu
(74) *Attorney, Agent, or Firm* — Knobbe, Martens, Olson & Bear, LLP

(57) ABSTRACT

A method and an apparatus for generating information are provide according to embodiments of the disclosure. A specific embodiment of the method comprises: acquiring to-be-analyzed information according to a target keyword; and inputting the to-be-analyzed information into a pre-established sentiment analysis model to generate sentiment orientation information of the to-be-analyzed information. The sentiment analysis model is obtained through following training: acquiring untagged sample data and tagged sample data; generating tag information corresponding to the untagged sample data using a pre-established tag generation model, and using the untagged sample data and the generated tag information as extended sample data, the tag generation model being used to represent a corresponding relationship between the untagged sample data and the tag information; and obtaining the sentiment analysis model by training using the tagged sample data and the extended sample data.

14 Claims, 3 Drawing Sheets

(51) Int. Cl.

| | |
|---|---|
| *G06N 3/08* | (2006.01) |
| *G06K 9/62* | (2006.01) |
| *G06F 16/35* | (2019.01) |
| *G06F 40/279* | (2020.01) |
| *G06F 40/205* | (2020.01) |
| *G06F 40/242* | (2020.01) |
| *G06F 16/31* | (2019.01) |

(52) U.S. Cl.
CPC ............. *G06K 9/6259* (2013.01); *G06N 3/08* (2013.01); *G06F 16/313* (2019.01); *G06F 40/205* (2020.01); *G06F 40/242* (2020.01)

(56) References Cited

U.S. PATENT DOCUMENTS

| | | | |
|---|---|---|---|
| 9,704,097 B2 * | 7/2017 | Devarajan | G06F 40/20 |
| 10,339,487 B2 * | 7/2019 | Schneeman | G06Q 10/06393 |
| 10,565,502 B2 * | 2/2020 | Scholtes | G06N 5/02 |
| 2012/0253792 A1 * | 10/2012 | Bespalov | G06F 16/353 |
| | | | 704/9 |
| 2013/0018824 A1 * | 1/2013 | Ghani | G06N 20/00 |
| | | | 706/12 |
| 2015/0186790 A1 * | 7/2015 | Ehlen | G06F 16/24578 |
| | | | 706/52 |
| 2016/0162456 A1 * | 6/2016 | Munro | G06F 16/288 |
| | | | 704/9 |

FOREIGN PATENT DOCUMENTS

| | | |
|---|---|---|
| CN | 106919673 | 7/2017 |
| CN | 107291696 | 10/2017 |

\* cited by examiner

METHOD AND APPARATUS FOR GENERATING INFORMATION

CROSS-REFERENCE TO RELATED APPLICATIONS

This application claims priority to Chinese Patent Application No. 201711214477.X, filed on Nov. 28, 2017, titled "Method and Apparatus for generating information," which is hereby incorporated by reference in its entirety.

TECHNICAL FIELD

Embodiments of the present disclosure relate to the field of computer technology, specifically to the field of Internet technology, and more specifically to a method and apparatus for generating information.

BACKGROUND

The textual sentiment analysis (also known as opinion mining) refers to the use of methods such as natural language processing, text mining, and computational linguistics to identify and extract subjective information in a source material. In some scenarios (e.g., poll monitoring, public opinion monitoring, and trend warning), sentiment orientations of data (e.g., micro-blog data, news data, post-bar data) acquired based on a target keyword need to be monitored, and the sentiment orientations mainly include positive, neutral, and negative. At present, a sentiment analysis model may be established based on a supervised learning method. Annotations need to be performed on a large amount of data according to the supervised learning method, so that sentiment words and sentence patterns are distributed as widely as possible, resulting in a better training effect. However, the annotations performed on the large amount of data need to consume a lot of manpower and material resources.

SUMMARY

Embodiments of the present disclosure provide a method and apparatus for generating information.

In a first aspect, the embodiments of the present disclosure provide a method for generating information. The method includes: acquiring to-be-analyzed information according to a target keyword; and inputting the to-be-analyzed information into a pre-established sentiment analysis model to generate sentiment orientation information of the to-be-analyzed information. The sentiment analysis model is obtained through following training: acquiring untagged sample data and tagged sample data; generating tag information corresponding to the untagged sample data using a pre-established tag generation model, and using the untagged sample data and the generated tag information as extended sample data, the tag information including a first tag, a second tag, and a third tag, and the tag generation model being used to represent a corresponding relationship between the untagged sample data and the tag information; and obtaining the sentiment analysis model by training using the tagged sample data and the extended sample data.

In some embodiments, the tag generation model includes a first tag generation model, a second tag generation model, and a third tag generation model. The generating tag information corresponding to the untagged sample data using a pre-established tag generation model includes: using, in response to determining that at least two of the first tag generation model, the second tag generation model, and the third tag generation model generate identical tag information for the untagged sample data, the tag information generated for the untagged sample data by the at least two tag generation models as the tag information of the untagged sample data.

In some embodiments, the method further includes training the first tag generation model, the second tag generation model, and the third tag generation model. The training the first tag generation model, the second tag generation model, and the third tag generation model includes: performing a word segmentation on text in the tagged sample data to obtain at least one segmented word, where the tagged sample data include the text and tag information corresponding to the text; obtaining a first word set according to the at least one segmented word, and training an initial text classifier by using a characteristic vector corresponding to the first word set as an input and using the tag information corresponding to the text as an output to obtain the first tag generation model; extracting a sentiment word from the at least one segmented word to form a second word set, and training the initial text classifier by using a characteristic vector corresponding to the second word set as an input and using the tag information corresponding to the text as the output to obtain the second tag generation model; and extracting a non-sentiment word from the at least one segmented word to form a third word set, and training the initial text classifier by using a characteristic vector corresponding to the third word set as an input and using the tag information corresponding to the text as the output to obtain the third tag generation model.

In some embodiments, the method further includes: updating the first tag generation model, the second tag generation model, and the third tag generation model using the extended sample data.

In some embodiments, the sentiment analysis model is a deep neural network. The obtaining the sentiment analysis model by training using the tagged sample data and the extended sample data includes: using the text in the tagged sample data as an input sample, and using the tag information corresponding to the text as an output sample, where the tagged sample data include the text and the tag information corresponding to the text; using the untagged sample data in the extended sample data as an input sample, and using the generated tag information corresponding to the untagged sample data as an output sample; and training an initial deep neural network using the input samples and the output samples to obtain the sentiment analysis model.

In some embodiments, the training an initial deep neural network using the input samples and the output samples to obtain the sentiment analysis model includes: performing a performance evaluation on the obtained sentiment analysis model using test data in a preset test data set; and determining, according to a performance evaluation result, whether the obtained sentiment analysis model is a final sentiment analysis model.

In a second aspect, the embodiments of the present disclosure provide an apparatus for generating information. The apparatus includes: an acquiring unit, configured to acquire to-be-analyzed information according to a target keyword; and a generating unit, configured to input the to-be-analyzed information into a pre-established sentiment analysis model to generate sentiment orientation information of the to-be-analyzed information. The generating unit includes: a data acquiring unit, configured to acquire untagged sample data and tagged sample data; a tag information generating unit, configured to generate tag information corresponding to the untagged sample data using a pre-established tag generation model, and use the untagged sample data and the generated tag information as extended sample data, the tag information including a first tag, a second tag, and a third tag, and the tag generation model being used to represent a corresponding relationship between the untagged sample data and the tag information; and a training unit, configured to obtain the sentiment analysis model by training using the tagged sample data and the extended sample data.

In some embodiments, the tag generation model includes a first tag generation model, a second tag generation model, and a third tag generation model. The tag information generating unit is further configured to: use, in response to determining that at least two of the first tag generation model, the second tag generation model, and the third tag generation model generate identical tag information for the untagged sample data, the tag information generated for the untagged sample data by the at least two tag generation models as the tag information of the untagged sample data, the tag information generated for the untagged sample data by the at least two tag generation models as the tag information of the untagged sample data.

In some embodiments, the apparatus further includes a tag generation model training unit. The tag generation model training unit is configured to: perform a word segmentation on text in the tagged sample data to obtain at least one segmented word, where the tagged sample data include the text and tag information corresponding to the text; obtain a first word set according to the at least one segmented word, and train an initial text classifier by using a characteristic vector corresponding to the first word set as an input and using the tag information corresponding to the text as an output to obtain the first tag generation model; extract a sentiment word from the at least one segmented word to form a second word set, and train the initial text classifier by using a characteristic vector corresponding to the second word set as an input and using the tag information corresponding to the text as the output to obtain the second tag generation model; and extract a non-sentiment word from the at least one segmented word to form a third word set, and train the initial text classifier by using a characteristic vector corresponding to the third word set as an input and using the tag information corresponding to the text as the output to obtain the third tag generation model.

In some embodiments, the apparatus further includes: an updating unit, configured to update the first tag generation model, the second tag generation model, and the third tag generation model using the extended sample data.

In some embodiments, the sentiment analysis model is a deep neural network. The training unit includes: a first input and output determining unit, configured to use the text in the tagged sample data as an input sample, and use the tag information corresponding to the text as an output sample, where the tagged sample data include the text and the tag information corresponding to the text; a second input and output determining unit, configured to use the untagged sample data in the extended sample data as an input sample, and use the generated tag information corresponding to the untagged sample data as an output sample; and a model training unit, configured to train an initial deep neural network using the input samples and the output samples to obtain the sentiment analysis model.

In some embodiments, the model training unit is further configured to: perform a performance evaluation on the obtained sentiment analysis model using test data in a preset test data set; and determine, according to a performance evaluation result, whether the obtained sentiment analysis model is a final sentiment analysis model.

In a third aspect, the embodiments of the present disclosure provide a terminal. The terminal includes: one or more processors; and a storage device, configured to store one or more programs. The one or more programs, when executed by the one or more processors, cause the one or more processors to implement the method according to any implementation in the first aspect.

In a fourth aspect, the embodiments of the present disclosure provide a computer readable storage medium storing a computer program. The computer program, when executed by a processor, implements the method according to any implementation in the first aspect.

According to the method and apparatus for generating information provided by the embodiments of the present disclosure, the to-be-analyzed information is first acquired according to the target keyword. Then, the to-be-analyzed information is inputted into the sentiment analysis model to generate the sentiment orientation information of the to-be-analyzed information. The sentiment analysis model is obtained through following training: acquiring the untagged sample data and the tagged sample data; generating the tag information corresponding to the untagged sample data using the tag generation model, and using the untagged sample data and the generated tag information as the extended sample data; and obtaining the sentiment analysis model by training using the tagged sample data and the extended sample data. Thus, the extended sample data is automatically generated, which extends data in the sample set, reduces costs for manual annotation, and improves accuracy of the information generated by the sentiment analysis model.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
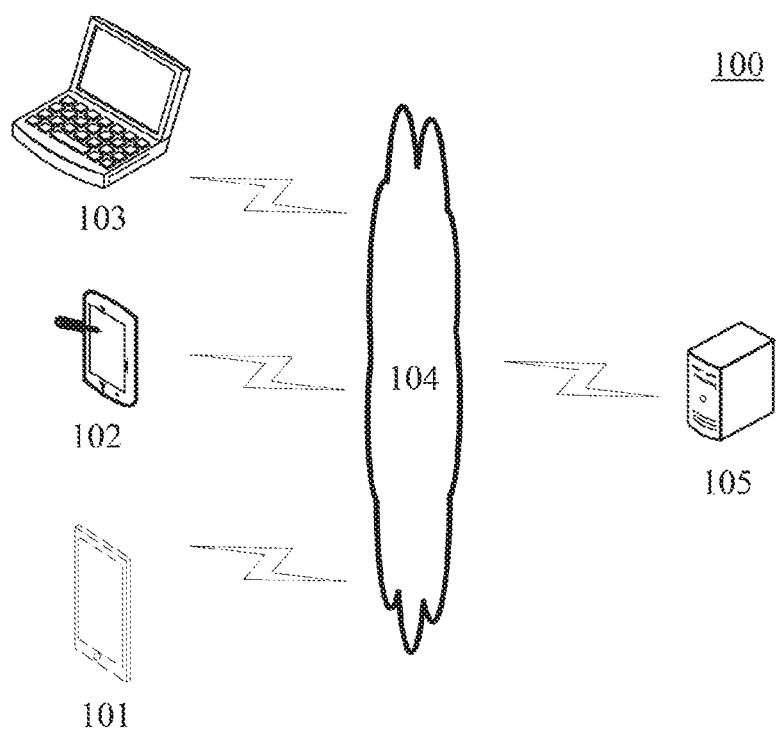
FIG. 1 illustrates a system architecture in which some embodiments of the present disclosure may be applied.

FIG. 1 shows a system architecture 100 in which a method for generating information or an apparatus for generating information can be implemented according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as webpage browsing applications, shopping applications, search applications, instant messaging tools, mailbox clients, and social platform software may be installed on the terminal devices 101, 102 and 103.

The terminal devices 101, 102 and 103 may be various electronic devices having display screens and being capable of processing information, including but not limited to, smart phones, tablet computers, laptop computers and desktop computers.

The server 105 may be a server providing various services, for example, a backend server providing a support for information acquired by the terminal devices 101, 102 and 103. The backend server may perform a processing such as an analysis on data such as a received target keyword, and return a processing result (for example, grabbed information related to target keyword) to the terminal devices.

It should be noted that the method for generating information according to the embodiments of the present disclosure is generally executed by the terminal devices 101, 102 and 103. Accordingly, an apparatus for generating information is generally installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
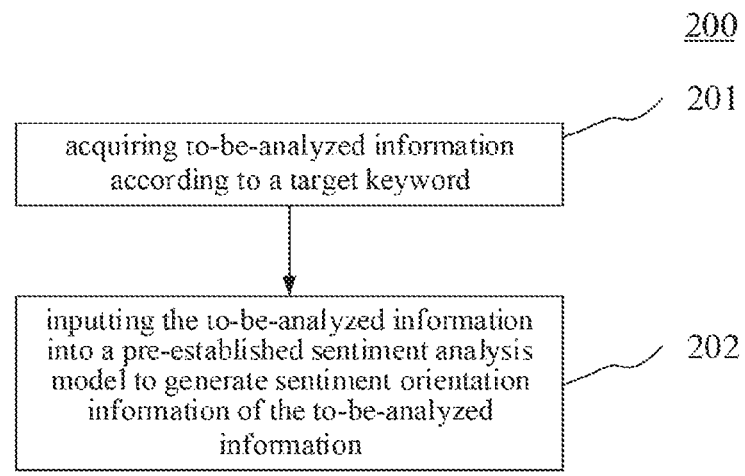
FIG. 2 is a flowchart of an embodiment of a method for generating information according to the present disclosure.

Reference is made to FIG. 2, which illustrates a flow 200 of an embodiment of a method for generating information according to the present disclosure. The method for generating information includes steps 201 and 202.

Step 201 includes acquiring to-be-analyzed information according to a target keyword.

In this embodiment, an electronic device (e.g., the terminal devices 101, 102, and 103 as illustrated in FIG. 1) on which the method for generating information is performed may acquire the to-be-analyzed information according to the target keyword. For example, the electronic device may acquire the to-be-analyzed information from a preset set of to-be-analyzed information according to the target keyword. As another example, the electronic device may acquire the to-be-analyzed information from a server according to the target keyword. For instance, the electronic device may send the target keyword to the server. The server may grab information related to the target keyword from the Internet according to the received target keyword, and send the grabbed information to the electronic device. The electronic device may use the information grabbed by the server as the to-be-analyzed information.

Step 202 includes inputting the to-be-analyzed information into a pre-established sentiment analysis model, to generate sentiment orientation information of the to-be-analyzed information.

In this embodiment, the electronic device may input the to-be-analyzed information into the pre-established sentiment analysis model to generate the sentiment orientation information of the to-be-analyzed information. Here, the sentiment analysis model may be used to represent a corresponding relationship between the to-be-analyzed information and the sentiment orientation information. The sentiment orientation information may be used to represent a sentiment orientation of content expressed by the to-be-analyzed information. For example, the sentiment orientation information may be positive/supportive, neutral/impartial, negative/opposed, or the like.

Here, the sentiment analysis model may be obtained by following training using the electronic device or other electronic devices for training the sentiment analysis model.

First, untagged sample data and tagged sample data may be acquired. For example, the untagged sample data may be acquired from a preset untagged sample data set. For instance, the untagged sample data may be text. As another example, the tagged sample data may be acquired from a preset tagged sample data set. For instance, the tagged sample data may include text and tag information corresponding to the text. The tag information may be used to identify a sentiment orientation of the text. For instance, the sentiment orientation may be positive, neutral, negative, or the like.

Then, tag information corresponding to the untagged sample data may be generated using a pre-established tag generation model. The untagged sample data and the generated tag information may be used as extended sample data. The tag information may include a first tag, a second tag, and a third tag. As an example, the first tag may be the numeral "1," representing that the untagged sample data is positive/supportive information. The second tag may be the numeral "0," representing that the untagged sample data is neutral/impartial information. The third tag may be the numeral "−1," representing that the untagged sample data is negative/opposed information. The tag generation model may be used to represent a corresponding relationship between the untagged sample data and the tag information. As an example, the tag generation model may be a corresponding relationship table pre-established based on statistics of a large amount of untagged sample data and tag information by a skilled person, the corresponding relationship table storing a plurality of corresponding relationships between the untagged sample data and the tag information.

Finally, the sentiment analysis model is obtained by training using the tagged sample data and the extended sample data.

In some alternative implementations of this embodiment, the tag generation model may include a first tag generation model, a second tag generation model, and a third tag generation model. The step of generating the tag information corresponding to the untagged sample data using the pre-established tag generation model may include: in response to determining that at least two of the first tag generation model, the second tag generation model, and the third tag generation model generate identical tag information for the untagged sample data, using the tag information generated for the untagged sample data by the at least two tag generation models as the tag information of the untagged sample data.

In some alternative implementations, the method for generating information may further include: training the first tag generation model, the second tag generation model, and the third tag generation model. The training may include the following steps.

First, a word segmentation may be performed on the text in the tagged sample data, to obtain at least one segmented word. The tagged sample data may include the text and the tag information corresponding to the text. The tag information may include a first tag, a second tag, and a third tag.

Next, a first word set may be obtained according to the at least one segmented word. An initial text classifier is trained by using a characteristic vector corresponding to the first word set as an input, and using the tag information corresponding to the text as an output, to obtain the first tag generation model. As an example, all of the at least one segmented word may be used as a word in the first word set. The characteristic vector of the first word set is obtained by a bag-of-words (BoW) model. According to the bag-of-words model, elements of the text such as the grammar and the word order are ignored, the text is only used as a collection of words, and each word in the document is independent. The bag-of-words model may use a group of unordered words to express text or a document. For example, there are two simple text documents as follows: "Xiaoming likes watching movies, and Xiaohong also likes watching movies," and "Xiaogang also likes watching football matches." By performing the word segmentation on the above two text documents, the segmented words may be respectively obtained as follows: "Xiaoming, likes, watching, movies, Xiaohong, also, likes," and "Xiaogang, also, likes, watching, football, matches." Based on the above two documents, one dictionary may be built as {Xiaoming: 1, likes: 2, watching: 3, movies: 4, Xiaohong: 5, also: 6, Xiaogang: 7, football: 8, matches: 9}. The dictionary may contain 9 words, and each of the words has a unique index. Thus, the two text documents may be represented by 9-dimensional vectors [1,2,1,1,1,1,0,0,0] and [0,1,1,0,0,0,1,1,1]. The vectors are related to the frequency of occurrence of each word in the text, rather than the orders of the words in the text. Here, the initial text classifier may be a text classifier obtained in various ways. For example, the text classifier is obtained by randomly generating network parameters of the text classifier based on the existing text classification algorithm (e.g., FastText). It should be noted that the process of training the first tag generation model is only used to describe a process of adjusting parameters of the first tag generation model. Thus, it may be considered that the initial text classifier is the model whose parameters are not adjusted, and the first tag generation model is the model having the adjusted parameters. The process of adjusting the parameters of the model may be repeated a plurality of times according to the optimization degree of the model and actual needs, and not just limited to once.

Then, a sentiment word may be extracted from the at least one segmented word to form a second word set. The initial text classifier may be trained by using a characteristic vector corresponding to the second word set as an input and using the tag information corresponding to the text as the output, to obtain the second tag generation model. As an example, each segmented word in the at least one segmented word may be compared with a sentiment word in a pre-established sentiment dictionary. The sentiment word is extracted from the at least one segmented word according to the comparing result to form the second word set. As an example, the characteristic vector corresponding to the second word set may be generated by using the bag-of-words model. Here, the initial text classifier may be the text classifier obtained in various ways.

Finally, a non-sentiment word may be extracted from the at least one segmented word to form a third word set. The initial text classifier may be trained by using a characteristic vector corresponding to the third word set as an input and using the tag information corresponding to the text as the output, to obtain the third tag generation model. As an example, each segmented word in the at least one segmented word may be compared with a non-sentiment word in a pre-established non-sentiment dictionary. The non-sentiment word is extracted from the at least one segmented word according to the comparing result to form the third word set. As an example, the characteristic vector corresponding to the third word set may be generated by using the bag-of-words model. Here, the initial text classifier may be the text classifier obtained in various ways.

Alternatively, the method for generating information may further include: updating the first tag generation model, the second tag generation model, and the third tag generation model using the extended sample data.

In some alternative implementations of this embodiment, the sentiment analysis model may be a deep neural network. The obtaining the sentiment analysis model (deep neural network, DNN) by training using the tagged sample data and the extended sample data may include the following steps. First, the text in the tagged sample data may be used as an input sample, and the tag information corresponding to the text may be used as an output sample. The tagged sample data may include the text and the tag information corresponding to the text. Then, the untagged sample data in the extended sample data may be used as an input sample, and the generated tag information corresponding to the untagged sample data may be used as an output sample. Finally, an initial deep neural network may be trained using the input samples and the output samples, to obtain the sentiment analysis model. Here, the initial deep neural network may be obtained in various ways. For example, the deep neural network is obtained by randomly generating network parameters of a deep neural network algorithm. It should be noted that the process of training the sentiment analysis model is only used to describe a process of adjusting parameters of the sentiment analysis model. Thus, it may be considered that the initial deep neural network is the model whose parameters are not adjusted, and the sentiment analysis model is the model having adjusted parameters. The process of adjusting the parameters of the model may be repeated a plurality of times according to the optimization degree of the model and actual needs, and not just limited to once.

In some alternative implementations, the step of training the initial deep neural network using the input samples and the output samples to obtain the sentiment analysis model may include the following steps. First, a performance evaluation may be performed on the obtained sentiment analysis model using test data in a preset test data set. Then, whether the obtained sentiment analysis model is a final sentiment analysis model is determined according to the performance evaluation result. As an example, whether the sentiment analysis model needs more training may be determined according to indicators such as the test accuracy rate, the recall rate, and the F1 value of the sentiment analysis model in the test data set.

Figure 3:
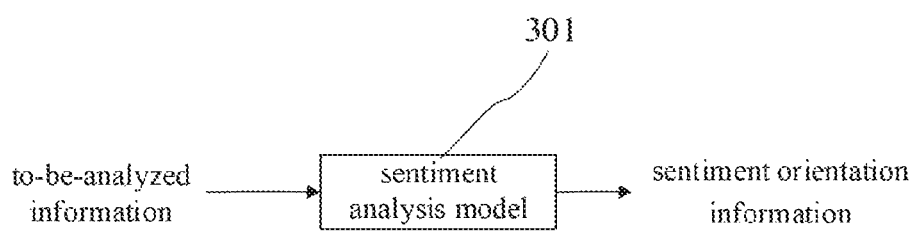
FIG. 3 is a schematic diagram of an application scenario of the method for generating information according to some embodiments of the present disclosure.

Further referring to FIG. 3, FIG. 3 is a schematic diagram of an application scenario of the method for generating information according to this embodiment. In the application scenario of FIG. 3, the to-be-analyzed information is first acquired through the target keyword. Then, the to-be-analyzed information is inputted into the pre-established sentiment analysis model 301 to generate the sentiment orientation information of the to-be-analyzed information. The sentiment analysis model is obtained through the following steps. The untagged sample data and the tagged sample data are acquired. Then, the tag information corresponding to the untagged sample data is generated using the tag generation model, and the untagged sample data and the generated tag information are used as the extended sample data. Finally, the sentiment analysis model is obtained by training using the tagged sample data and the extended sample data.

In the method provided by the above embodiment of the present disclosure, the extended sample data is automatically generated, which extends data in the sample set, reduces costs for manual annotation, and improves accuracy of the information generated by the sentiment analysis model.

Figure 4:
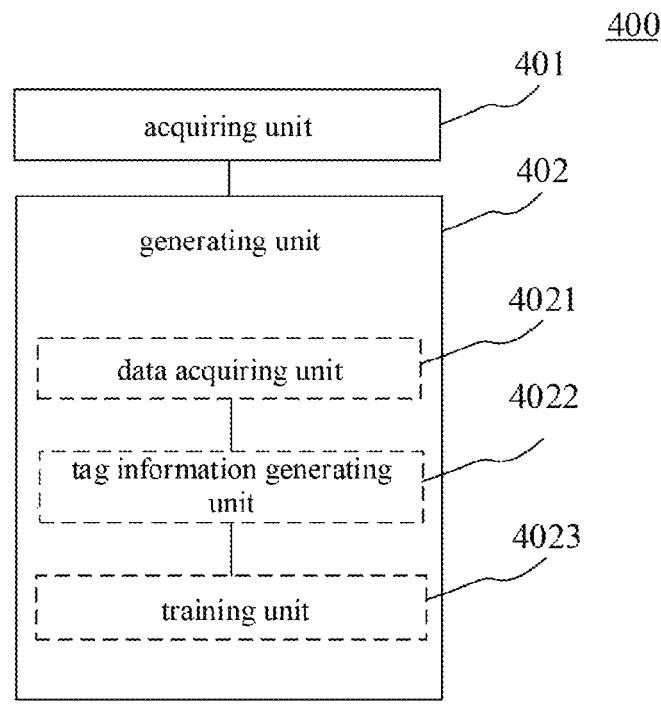
FIG. 4 is a schematic structural diagram of an embodiment of an apparatus for generating information according to the present disclosure.

Further referring to FIG. 4, as an implementation of the method shown in the above figures, the present disclosure provides an embodiment of an apparatus for generating information. The embodiment of the apparatus corresponds to the embodiment of the method illustrated in FIG. 2, and the apparatus may be applied in various electronic devices.

As shown in FIG. 4, the apparatus 400 for generating information according to this embodiment includes: an acquiring unit 401 and a generating unit 402. The generating unit 402 includes: a data acquiring unit 4021, a tag information generating unit 4022, and a training unit 4023. The acquiring unit 401 is configured to acquire to-be-analyzed information according to a target keyword. The generating unit 402 is configured to input the to-be-analyzed information into a pre-established sentiment analysis model to generate sentiment orientation information of the to-be-analyzed information. The data acquiring unit 4021 is configured to acquire untagged sample data and tagged sample data. The tag information generating unit 4022 is configured to generate tag information corresponding to the untagged sample data using a pre-established tag generation model, and use the untagged sample data and the generated tag information as extended sample data. The tag information includes a first tag, a second tag, and a third tag, and the tag generation model is used to represent a corresponding relationship between the untagged sample data and the tag information. The training unit 4023 is configured to train using the tagged sample data and the extended sample data to obtain the sentiment analysis model.

In this embodiment, for specific processing of the acquiring unit 401, the generating unit 402, the data acquiring unit 4021, the tag information generating unit 4022, and the training unit 4023, and their technical effects, reference may be made to relative descriptions of step 201 and step 202 in the corresponding embodiment of FIG. 2 respectively, which will not be repeatedly described here.

In some alternative implementations of this embodiment, the tag generation model may include a first tag generation model, a second tag generation model, and a third tag generation model. The tag information generating unit may further be configured to: use, in response to determining that at least two of the first tag generation model, the second tag generation model, and the third tag generation model generate identical tag information for the untagged sample data, the tag information generated for the untagged sample data by the at least two tag generation models as the tag information of the untagged sample data.

In some alternative implementations of this embodiment, the apparatus may further include a tag generation model training unit (not shown in the drawing). The tag generation model training unit is configured to: perform a word segmentation on text in the tagged sample data to obtain at least one segmented word, where the tagged sample data include the text and tag information corresponding to the text; obtain a first word set according to the at least one segmented word, and train an initial text classifier by using a characteristic vector corresponding to the first word set as an input and using the tag information corresponding to the text as an output to obtain the first tag generation model; extract a sentiment word from the at least one segmented word to form a second word set, and train the initial text classifier by using a characteristic vector corresponding to the second word set as an input and using the tag information corresponding to the text as the output to obtain the second tag generation model; and extract a non-sentiment word from the at least one segmented word to form a third word set, and train the initial text classifier by using a characteristic vector corresponding to the third word set as an input and using the tag information corresponding to the text as the output to obtain the third tag generation model.

In some alternative implementations of this embodiment, the apparatus 400 may further include: an updating unit (not shown in the drawing). The updating unit is configured to update the first tag generation model, the second tag generation model, and the third tag generation model using the extended sample data.

In some alternative implementations of this embodiment, the sentiment analysis model is a deep neural network. The training unit 4023 may include: a first input and output determining unit (not shown in the drawing), configured to use the text in the tagged sample data as an input sample, and use the tag information corresponding to the text as an output sample, where the tagged sample data include the text and the tag information corresponding to the text; a second input and output determining unit (not shown in the drawing), configured to use the untagged sample data in the extended sample data as an input sample, and use the generated tag information corresponding to the untagged sample data as an output sample; and a model training unit (not shown in the drawing), configured to train an initial deep neural network using the input samples and the output samples to obtain the sentiment analysis model.

In some alternative implementations of this embodiment, the model training unit may further be configured to: perform a performance evaluation on the obtained sentiment analysis model using test data in a preset test data set; and determine, according to the performance evaluation result, whether the obtained sentiment analysis model is a final sentiment analysis model.

Figure 5:
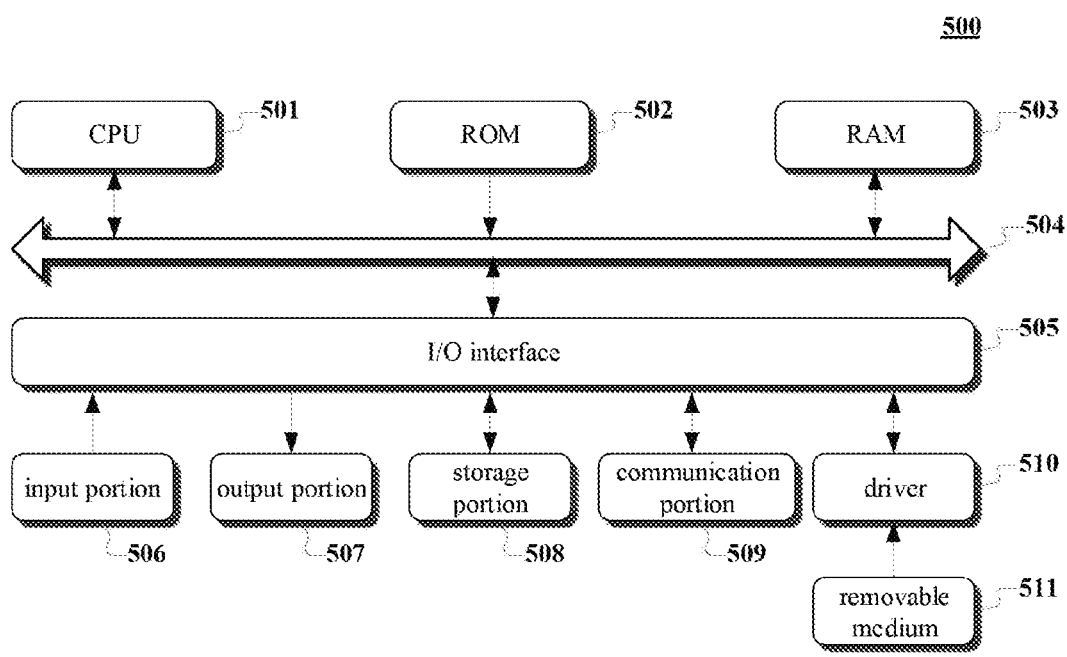
FIG. 5 is a schematic structural diagram of a computer system adapted to implement a terminal device according to the embodiments of the present disclosure.

Referring to FIG. 5, a schematic structural diagram of a computer system 500 adapted to implement a terminal device of the embodiments of the present disclosure is shown. The terminal device shown in FIG. 5 is only an example, and should not limit a function and scope of the embodiment of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface X05 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a generating unit and a data acquiring unit, a tag information generating unit, and a training unit where the names of these units do not in some cases constitute a limitation to such units themselves. For example, the acquiring unit may also be described as "a unit for acquiring to-be-analyzed information according to a target keyword."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: acquire to-be-analyzed information according to a target keyword; and input the to-be-analyzed information into a pre-established sentiment analysis model to generate sentiment orientation information of the to-be-analyzed information, the sentiment analysis model being obtained through following training: acquiring untagged sample data and tagged sample data; generating tag information corresponding to the untagged sample data using a pre-established tag generation model, and using the untagged sample data and the generated tag information as extended sample data, the tag information including a first tag, a second tag, and a third tag, and the tag generation model being used to represent a corresponding relationship between the untagged sample data and the tag information; and obtaining the sentiment analysis model by training using the tagged sample data and the extended sample data.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
acquiring to-be-analyzed information according to a target keyword; and
inputting the to-be-analyzed information into a pre-established sentiment analysis model to generate sentiment orientation information of the to-be-analyzed information, the sentiment analysis model being obtained through following training:
acquiring untagged sample data and tagged sample data;
generating tag information corresponding to the untagged sample data using a pre-established tag generation model, and using the untagged sample data and the generated tag information as extended sample data, the tag information including a first tag, a second tag, and a third tag, and the tag generation model being used to represent a corresponding relationship between the untagged sample data and the tag information; and
obtaining the sentiment analysis model by training using the tagged sample data and the extended sample data,
wherein the tag generation model includes a first tag generation mode, the tagged sample data includes text documents each being consisted of at least one word, and the method further comprises: establishing a dictionary including all different words included in the text documents; acquiring a n-dimensional characteristic vector of a text document of the text documents, wherein n is a number of words in the dictionary, and each of n elements of the n-dimensional characteristic vector is a number of occurrence that one given word of the dictionary is included in a given text document; and training an initial text classifier using the n-dimensional characteristic vector as an input and using tag information corresponding to the text document as an output, to obtain the first tag generation model.

2. The method according to claim 1, wherein the tag generation model includes a second tag generation model, and a third tag generation model, and
the generating tag information corresponding to the untagged sample data using a pre-established tag generation model comprises:
using, in response to determining that at least two of the first tag generation model, the second tag generation model, and the third tag generation model generate identical tag information for the untagged sample data, the tag information generated for the untagged sample data by the at least two tag generation models as the tag information of the untagged sample data.

3. The method according to claim 2, further comprising training the second tag generation model, and the third tag generation model, wherein the training the second tag generation model, and the third tag generation model comprises:
performing a word segmentation on text in the tagged sample data to obtain at least one segmented word, wherein the tagged sample data include the text and tag information corresponding to the text;
extracting a sentiment word from the at least one segmented word to form a second word set, and training the initial text classifier by using a characteristic vector corresponding to the second word set as an input and using the tag information corresponding to the text as the output to obtain the second tag generation model; and
extracting a non-sentiment word from the at least one segmented word to form a third word set, and training the initial text classifier by using a characteristic vector corresponding to the third word set as an input and using the tag information corresponding to the text as the output to obtain the third tag generation model.

4. The method according to claim 3, further comprising:
updating the first tag generation model, the second tag generation model, and the third tag generation model using the extended sample data.

5. The method according to claim 1, wherein the sentiment analysis model is a deep neural network; and
the obtaining the sentiment analysis model by training using the tagged sample data and the extended sample data comprises:
using text in the tagged sample data as an input sample, and using the tag information corresponding to the text as an output sample, wherein the tagged sample data include the text and the tag information corresponding to the text;
using the untagged sample data in the extended sample data as an input sample, and using the generated tag information corresponding to the untagged sample data as an output sample; and
training an initial deep neural network using the input samples and the output samples to obtain the sentiment analysis model.

6. The method according to claim 5, wherein the training an initial deep neural network using the input samples and the output samples to obtain the sentiment analysis model comprises:
performing, using test data in a preset test data set, a performance evaluation on the obtained sentiment analysis model; and
determining, according to a performance evaluation result, whether the obtained sentiment analysis model is a final sentiment analysis model.

7. The method according to claim 1, wherein the dictionary comprises n different words, and the given text document consists of m words, wherein for the n-dimensional characteristic vector of the given text document, each of (n-m) elements is zero and each of m elements is a number of occurrence of one given word of the given text document, wherein m is an integer smaller than n.

8. An apparatus for generating information, comprising:
at least one processor; and
a memory storing instructions, wherein the instructions when executed by the at least one processor, cause the at least one processor to perform operations, the operations comprising:
acquiring to-be-analyzed information according to a target keyword; and
inputting the to-be-analyzed information into a pre-established sentiment analysis model to generate sentiment orientation information of the to-be-analyzed information, the generating unit comprising:
acquiring untagged sample data and tagged sample data;
generating tag information corresponding to the untagged sample data using a pre-established tag generation model, and use the untagged sample data and the generated tag information as extended sample data, the tag information including a first tag, a second tag, and a third tag, and the tag generation model being used to represent a corresponding relationship between the untagged sample data and the tag information; and
obtaining the sentiment analysis model by training using the tagged sample data and the extended sample data, wherein the tag generation model includes a first tag generation mode, the tagged sample data includes text documents each being consisted of at least one word, and the method further comprises: establishing a dictionary including all different words included in the text documents; acquiring a n-dimensional characteristic vector of a text document of the text documents, wherein n is a number of words in the dictionary, and each of n elements of the n-dimensional characteristic vector is a number of occurrence that one given word of the dictionary is included in a given text document; and training an initial text classifier using the n-dimensional characteristic vector as an input and using tag information corresponding to the text document as an output, to obtain the first tag generation model.

9. The apparatus according to claim 8, wherein the tag generation model includes a second tag generation model, and a third tag generation model, and the generating tag information corresponding to the untagged sample data using a pre-established tag generation model comprises:

using, in response to determining that at least two of the first tag generation model, the second tag generation model, and the third tag generation model generate identical tag information for the untagged sample data, the tag information generated for the untagged sample data by the at least two tag generation models as the tag information of the untagged sample data.

10. The apparatus according to claim 9, wherein the operations further comprise training the second tag generation model, and the third tag generation model, wherein the training the second tag generation model, and the third tag generation model comprises:

performing a word segmentation on text in the tagged sample data to obtain at least one segmented word, wherein the tagged sample data include the text and tag information corresponding to the text;

extracting a sentiment word from the at least one segmented word to form a second word set, and train the initial text classifier by using a characteristic vector corresponding to the second word set as an input and using the tag information corresponding to the text as the output to obtain the second tag generation model; and extracting a non-sentiment word from the at least one segmented word to form a third word set, and train the initial text classifier by using a characteristic vector corresponding to the third word set as an input and using the tag information corresponding to the text as the output to obtain the third tag generation model.

11. The apparatus according to claim 10, wherein the operations further comprise:

updating the first tag generation model, the second tag generation model, and the third tag generation model using the extended sample data.

12. The apparatus according to claim 8, wherein the sentiment analysis model is a deep neural network; and the obtaining the sentiment analysis model by training using the tagged sample data and the extended sample data comprises:

using text in the tagged sample data as an input sample, and use the tag information corresponding to the text as an output sample, wherein the tagged sample data include the text and the tag information corresponding to the text;

using the untagged sample data in the extended sample data as an input sample, and use the generated tag information corresponding to the untagged sample data as an output sample; and training an initial deep neural network using the input samples and the output samples to obtain the sentiment analysis model.

13. The apparatus according to claim 12, wherein the training an initial deep neural network using the input samples and the output samples to obtain the sentiment analysis model comprises:

performing, using test data in a preset test data set, a performance evaluation on the obtained sentiment analysis model; and determine, according to a performance evaluation result, whether the obtained sentiment analysis model is a final sentiment analysis model.

14. A non-transitory computer storage medium, storing a computer program, wherein the computer program, when executed by a processor, causes the processor to perform operations, the operations comprising:

acquiring to-be-analyzed information according to a target keyword; and inputting the to-be-analyzed information into a pre-established sentiment analysis model to generate sentiment orientation information of the to-be-analyzed information, the sentiment analysis model being obtained through following training:

acquiring untagged sample data and tagged sample data;

generating tag information corresponding to the untagged sample data using a pre-established tag generation model, and using the untagged sample data and the generated tag information as extended sample data, the tag information including a first tag, a second tag, and a third tag, and the tag generation model being used to represent a corresponding relationship between the untagged sample data and the tag information; and obtaining the sentiment analysis model by training using the tagged sample data and the extended sample data, wherein the tag generation model includes a first tag generation mode, the tagged sample data includes text documents each being consisted of at least one word, and the method further comprises: establishing a dictionary including all different words included in the text documents; acquiring a n-dimensional characteristic vector of a text document of the text documents, wherein n is a number of words in the dictionary, and each of n elements of the n-dimensional characteristic vector is a number of occurrence that one given word of the dictionary is included in a given text document; and training an initial text classifier using the n-dimensional characteristic vector as an input and using tag information corresponding to the text document as an output, to obtain the first tag generation model.

* * * * *